United States Patent [19]
Sarvary

[11] 3,875,903
[45] Apr. 8, 1975

[54] PET PAMPERS

[75] Inventor: Frank O. Sarvary, Glendale, Calif.

[73] Assignees: Frank O. Sarvary; Millicent A. Sarvary, both of Glendale, Calif.

[22] Filed: May 11, 1973

[21] Appl. No.: 359,577

[52] U.S. Cl. .................................................. 119/95
[51] Int. Cl. ............................................ A01k 23/00
[58] Field of Search ........................................ 119/95

[56] References Cited
UNITED STATES PATENTS
| | | | |
|---|---|---|---|
| 881,753 | 3/1908 | Whitehouse | 119/95 |
| 3,090,356 | 5/1963 | Andrisani | 119/95 |
| 3,656,459 | 4/1972 | Missud | 119/95 |

*Primary Examiner*—Hugh R. Chamblee
*Attorney, Agent, or Firm*—Roger A. Marrs

[57] ABSTRACT

The invention provides a disposable element for selectively controlling and disposing of pet droppings. The disposable element is removably mounted onto a frame which is fitted to the selected animal by means of a leather harness. The throw-away elements are made from paper and may be packaged in folded or collapsed configuration.

1 Claim, 6 Drawing Figures

PATENTED APR 8 1975　3,875,903

3,875,903

PET PAMPERS

This invention relates to pet supplies generally and in particular to an accessory for pets for sanitary disposal of the droppings therefrom.

To those fond of household pets, the matter of pet droppings has never seemed to be a problem. But, to many, such is a problem and to some a most serious one. With the former, pet droppings, as a general rule, remained where they fell and were removed only from the family home, car and perhaps other places which rarely seemed to include the local park, school yards and playgrounds. But, this can now all be changed. With the present invention, the keeper of household pets including dogs and cats can now keep the parks and playgrounds and the neighbors yard free from the droppings which that other group of individuals so frequently raise their voices in complaint.

With the present invention, the pet owner may now put in practice what ecology and the current environmental talk is all about. To do so does not impose any hardship on the owner nor is it especially uncomfortable for that beloved pet. Accordingly, the article or device according to the invention comprises in combination, a circular frame means, a harness means coupled to the frame means for removably fitting the article or device in operative disposition on the selected pet, and disposable means removably carried on the frame means for receiving the droppings when presented for sanitary disposition thereof.

It is therefore the primary purpose and objective of the invention to provide an article or device for the sanitary disposition of the droppings from household pets and the like.

It is another object of the invention to provide an article or device of the type described for household pets that utilizes a disposable element into which pet droppings are received when presented.

It is another object of the invention to provide an article or device of the type described that is removably fitted to the particular pet by way of an adjustable harness.

It is another object of the invention to provide an article or device of the type described that includes provisions for utilizing the animal's tail to further assure that droppings when presented are properly directed to the disposable element.

It is another object of the invention to provide an article or device of the type described using a disposable paper bag-like element that is removably attached to the frame thereof.

It is another object of the invention to provide an article or device of the type described that is efficient and comfortable in operation, easy to install and remove disposable elements and inexpensive to manufacture.

These features, objects and other advantages of the invention are more fully brought out in the following specification reference being had to drawing wherein.

Figure 1:
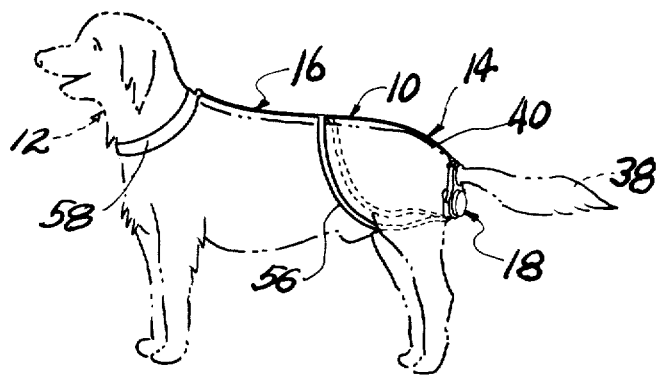
FIG. 1 is a perspective view of the article or device of the invention for sanitary control or disposition of pet droppings and serves to illustrate the manner in which said device is operatively fitted to a typical pet, in this case a small dog.

Referring now to the drawing, shown there in FIG. 1 in perspective view is an article or device 10 constructed according to the invention. FIG. 1 also serves to illustrate how the device 10 is normally used or fitted onto a pet such as the dog depicted by a reference numeral 12. The device 10 includes a frame 14, a harness 16 and a disposable element 18.

Figure 2:
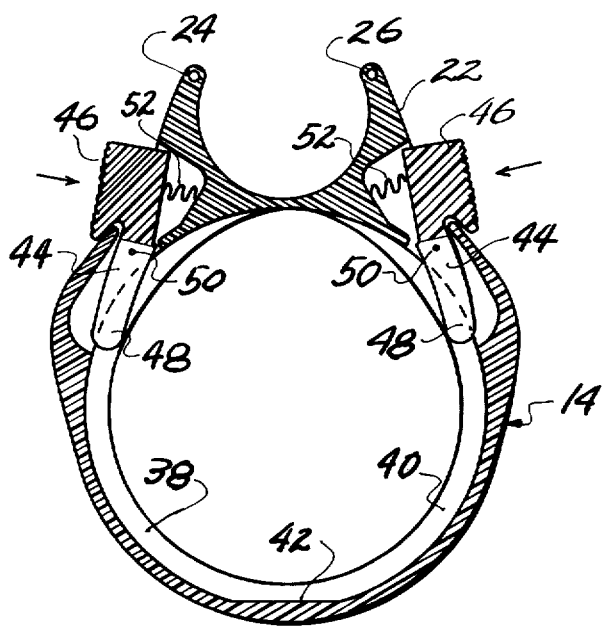
FIG. 2 is an enlarged elevational view in cross-section of the frame portion of the invention shown in FIG. 1.
Figure 3:
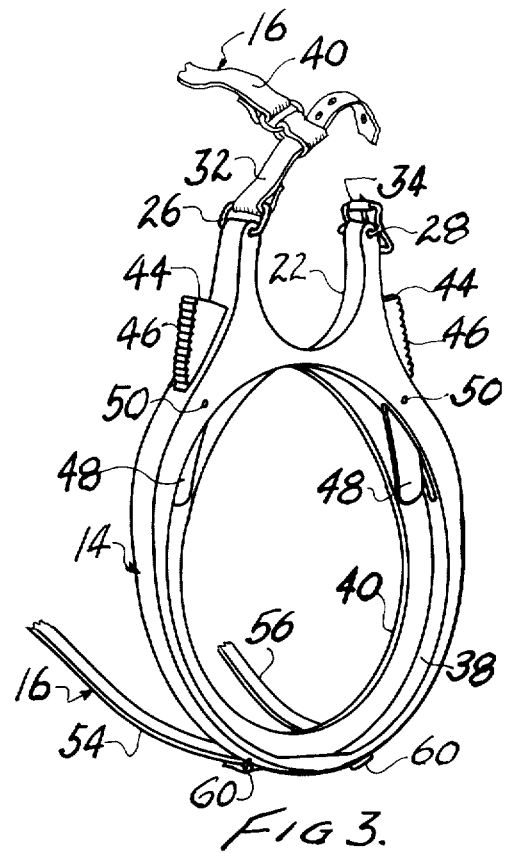
FIG. 3 is an enlarged perspective view of the frame portion of the invention shown in FIGS. 1 and 2.

As best seen in FIGS. 2 and 3, the frame 14 comprises a circular body 20 coextending below an upwardly directed half-circle portion 22 in figure 8-like arrangement. The half-circle portion 22, includes openings 24 and 26 for receiving rings 28 and 30 respectively, reference FIG. 3. Connected to the rings 28 and 30 is a strap 32 and a buckle 34 respectively, which when closed in a conventional manner serve to complete in circle-like fashion the half-circle portion 22.

Extending around substantially all of the circular body 20 along an inner edge portion 38 is an annular lip 40 for purposes to be described. At the lower most region of the circular body 20 is provided a retaining edge 42 that is disposed in spaced apart relationship with the lip 40 in the immediate area to form U-shaped cross-sectional configuration.

Mounted on each side of the circular body 20 near the half-circle portion 22 is a retaining clip 44 having a head portion 46 and a blade portion 48. The clip 44 is pivotally mounted to the frame 14 by way of a pivot pin 50. Interposed behind the head portion 46 and the frame 14 is a spring 52 for biasing the clip 44 in the noramlly closed position as shown in FIG. 2. It should be noted that upon depressing both head portions 46 towards each other, the blade portions 48 are moved further apart and no longer extend into the region defined by the annular lip 40, for reasons yet to be described.

The harness 16 includes the aforementioned rear strap 32, the back strap 40, a pair of leg and body straps 54 and 56 and a collar portion 58 as best seen in FIG. 1. The collar portion 58 may be of the commercially available adjustable type suitably fastened to the back strap 40. The leg and body straps may likewise be removably connected either to the back strap 40 or to the frame 14 at the lower portion thereof by means of a buckle/ring assembly as depicted in FIG. 3 by a reference 60.

In operation, the frame 14 is positioned as shown in FIG. 1 with the collar 58 positioned on the animal's neck. The back strap 40 is then loosely attached to the collar 58 after which the strap 32 is removably attached to the buckle 34. The leg and body straps 54 and 56 are then attached and in turn tightened to fit snugly without causing discomfort to the animal. If necessary, further minor adjustments may be made before the harness 16 is properly and comfortably fitted to the animal.

Figure 4:
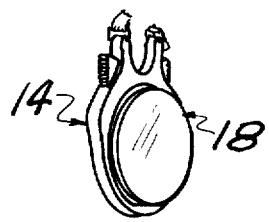
FIG. 4 is a perspective view of the frame portion of FIGS. 2 and 3 to which is mounted a disposable element, which element is shown in its collapsed configuration.
Figure 5:
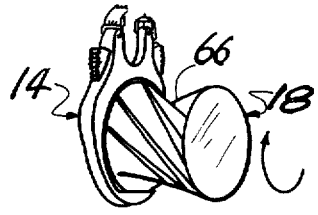
FIG. 5 is a perspective view showing the disposable element of FIG. 4 in a partially open or extended configuration and position.
Figure 6:
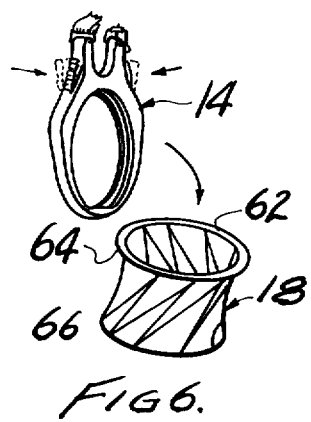
FIG. 6 is a perspective view showing the disposable element of FIGS. 4 and 5 in extended or opened disposition shortly after having been removed from its former mounting on the frame as occurs during each replacement.

In FIGS. 4, 5 and 6 is shown, in enlarged perspective, the disposable element 18 of FIG. 1. Referring first to FIG. 6, it should be noted that the element 18 includes a ring 62 having an annular surface 64 which, when operatively disposed in the frame 14, as shown in FIGS. 4 and 5 engagbly contacts a similar annular surface that forms the lip 40. It should be stated that the position the element 18 with its ring 62 aligned within the inner edge portion 38 of the frame 14, it is necessary first to depress the retaining clips 44 against their respective springs 52 and then next to make sure that the ring 62 has been inserted into the space between the annular lip 40 and the retaining edge 42 located at the lowermost part of the frame 14. After these two steps are completed, the element 18 may be urged into place at the uppermost part and the clips allowed to return to their normally closed position whereupon the blade portions 48 extend into the space region defined by the inner edge portion 38 and against that surface of the ring 62 that is opposite the surface 64. Removal of the element is achieved by following the above steps in reverse order.

The element 18 may be formed from any inexpensive and suitably pliable material including paper. Morein, with such materials, the element 18 may be provided with pleats or folds 66 along the sides thereof as best seen in FIGS. 5 and 6 so as to permit the element to be strip in a collapsed configuration similar to that as shown in FIG. 4.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claim so as to embrace any and all equivalent devices and methods.

I claim:
1. An article of commerce for pets including dogs, cats and the like for sanitary disposal of the droppings therefrom, comprising the combination,
circular frame means;
harness means coupled to said frame means for removably fitting said article in operative disposition on said pets;
disposable means removably carried on said frame means for receiving said droppings when presented for sanitary disposition thereof;
said frame means further includes an upstanding U-shaped element disposed along the upper portion thereof;
strap means attached at each end of said element for selectively securing the tail of said pet within said enclosed U-shaped element and said strap means being adapted to be removably connected to said harness means;
said harness means includes a collar for more comfortably fitting the article about the neck of the pet, a back strap interconnecting in a loose joint with said strap means to said collar and a pair of leg straps interconnecting said frame to said back strap,
said disposable means includes a bag-like container having a rigid rim and collapsible side walls formed from pliable material including paper; and
said frame means includes spring lock means resiliently co-acting with said rim for removably locking said container in operative disposition to said frame means.

* * * * *